J. S. HEARD & C. M. MILES.
FRUIT BASKET.
No. 47,822. Patented May 23, 1865.
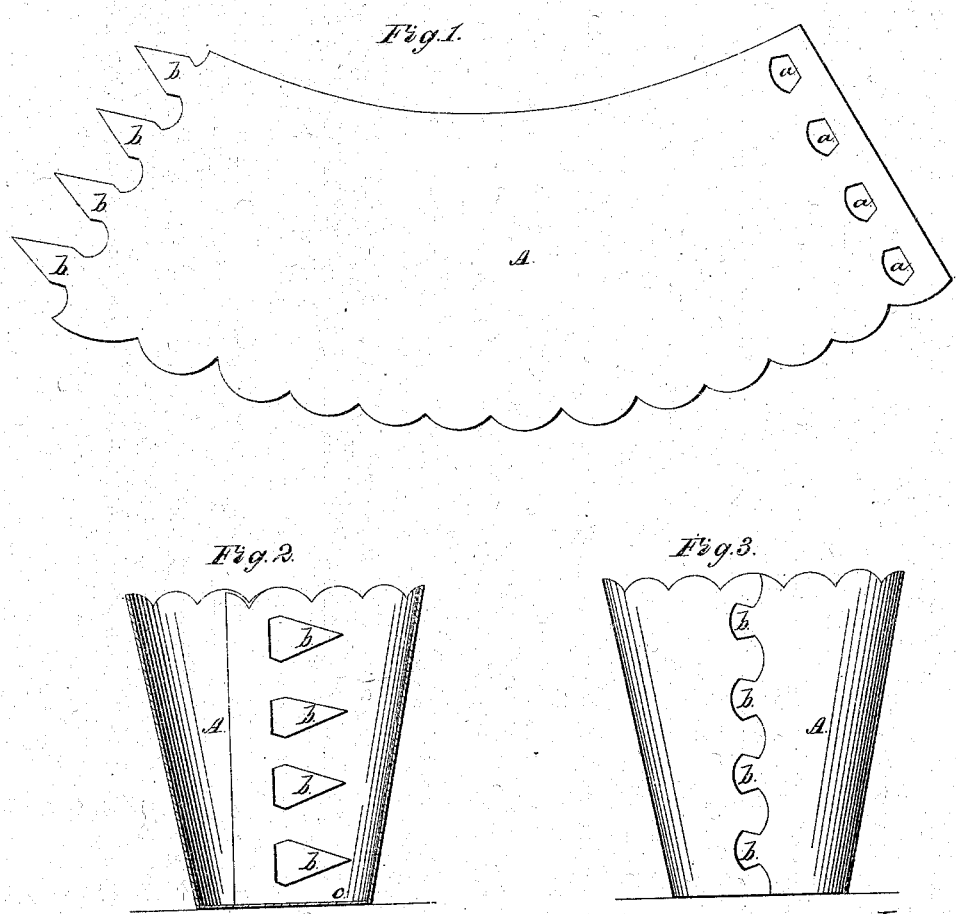

UNITED STATES PATENT OFFICE.

J. S. HOARD AND C. M. MILES, OF VINELAND, NEW JERSEY.

IMPROVEMENT IN FRUIT-BASKETS.

Specification forming part of Letters Patent No. 47,822, dated May 23, 1865.

*To all whom it may concern:*

Be it known that we, J. S. HOARD and CHAS. M. MILES, of Vineland, in the county of Cumberland and State of New Jersey, have invented a new and useful Improvement in Fruit-Baskets; and we do hereby declare that the following is a full, clear, and exact description thereof, which will enable those skilled in the art to make and use the same, reference being had to the accompanying drawings, forming part of this specification, in which—

Figure 1 represents the piece forming the body or sides of the basket when opened out before its ends are joined. Fig. 2 is a vertical section of the basket after it is made and set up. Fig. 3 is an outside elevation of the basket.

Similar letters of reference indicate corresponding parts.

This invention consists in a fruit-basket composed of any suitable thin material—such as paper, bark, or veneers of wood—the body of which is made by interlocking the two edges which come together when the material is bent to a conical or circular form, the bottom being made by dropping a circular piece of suitable size down into the basket.

Fig. 3 shows the basket completed. Its body A is made of any material which has the proper qualities of lightness and flexibility.

Fruit and berry baskets are needed in immense quantities at those seasons of the year in which berries and fruits are ready for market; and it being desirable to transport the said berries and fruits to market without jamming or bruising them, and in a convenient and desirable condition for sale, great efforts have been made to produce a cheap, light, and strong basket for that purpose.

Our invention has for its object to produce a basket which shall answer the required conditions, and which may be made and sent to the fruit grower or gatherer in blank, without setting up, so as to save expense in transportation and avoid danger of injury to them while in the hands of the carrier.

We take paper or bark or thin veneers of any light material, which, when interlocked along its ends, as hereinafter described, will have sufficient stiffness and strength to answer the purposes of a basket, and cut therefrom, by any suitably-formed cutter, a blank like that seen in Fig. 1, one end thereof being cut so as to form fingers $b$ thereon, and the other end having perforations $a$ cut therein in such positions and of such a size as to receive the fingers $b$. The blank is to be curved concentrically on its upper and lower sides, so that when its ends are brought together the basket will be flaring. The ends of the blank are to be on lines radial to the circles of which the said curves are parts. The upper or convex side of the blank is scalloped, as shown, to form an ornamental top to the basket. In order to form the basket from such a blank, the fingers $b$ are inserted into the holes $a$ from the outside of the blank, so that their ends will be concealed within the basket, as seen in the sectional elevation, Fig. 2. The said fingers are then cemented or glued to the adjacent side of the basket, so that they cannot be slipped back through the holes $a$. The shapes of the holes and fingers are formed with reference to each other so that they will form a good firm joint. The bottom of the basket is formed by cutting out a circular piece from like material as that from which the blank A is cut, and of a size to fit within the compass of the smaller end of the basket, and dropping such circular piece through the larger end to its place, where it will form a bottom like that seen at $c$, Fig. 2. Baskets made in this way will be sufficiently strong and light for the purposes above mentioned, and their cheapness will make them to be of importance to the growers of berries and fruit, whose profits have hitherto been seriously diminished by the expensiveness of the baskets and boxes hitherto used for sending such articles to market. The blank sides or body and the bottom $c$ of these baskets can be prepared where material and labor are cheap, and then packed in small compass in a flat condition, like layers of veneers, to the market-gardener or fruit and berry grower, who can easily put them together for use. It is not necessary to cement the fingers to the sides of the basket in order to keep them in place, since they will retain their hold of the eyes, and thus keep the basket in its integrity. The scalloped edge is only for ornament, and is therefore not essential in the making of the basket.

We claim as new and desire to secure by Letters Patent—

The above-described berry and fruit basket, constructed as above set forth, as a new article of manufacture.

J. S. HOARD.
CHARLES M. MILES.

Witnesses:
W. A. HOUSE,
CHAS. F. FITCH.